United States Patent
Pedersen

(10) Patent No.: US 7,840,008 B2
(45) Date of Patent: Nov. 23, 2010

(54) METHOD AND APPARATUS FOR DECRYPTING A COMMUNICATION

(75) Inventor: Kristian Gronkjaer Pedersen, Vaerlose (DK)

(73) Assignee: Motorola, Inc., Schaumburg, IL (US)

( * ) Notice: Subject to any disclaimer, the term of this patent is extended or adjusted under 35 U.S.C. 154(b) by 1081 days.

(21) Appl. No.: 11/539,213

(22) Filed: Oct. 6, 2006

(65) Prior Publication Data
US 2008/0031453 A1    Feb. 7, 2008

(51) Int. Cl.
*H04K 1/00*    (2006.01)
*H04L 9/00*    (2006.01)

(52) U.S. Cl. .......................... 380/270; 380/44; 380/45; 380/46; 380/47; 380/247; 380/248; 380/249; 380/250; 380/271; 380/272; 380/273; 380/274

(58) Field of Classification Search ............. 380/44–47, 380/247–250, 270–274
See application file for complete search history.

(56) References Cited

U.S. PATENT DOCUMENTS

| 5,060,266 | A | * | 10/1991 | Dent ........................... 380/274 |
| 5,546,464 | A | * | 8/1996 | Raith et al. .................. 380/272 |
| 2002/0006197 | A1 | * | 1/2002 | Carroll et al. ................. 380/44 |
| 2002/0159598 | A1 | * | 10/2002 | Rubinstein et al. .......... 380/259 |

FOREIGN PATENT DOCUMENTS

| EP | 0446194 A1 | 9/1991 |
| EP | 0667691 A2 | 8/1995 |
| EP | 1094634 A2 | 4/2001 |
| WO | 96/09725 A2 | 3/1996 |

OTHER PUBLICATIONS

"An Analysis of the Statistical Self-Synchronization of Stream Ciphers" (IEEE INFOCOM 2001) by Dr. Howard M. Heys.*
"Analysis of the Statistical Cipher Feedback Mode of Block Ciphers" by Dr. Howard M. Heys, IEE Transactions on Computers vol. 52 No. 1 (Jan. 2003).*
PCT/US05/13208, PCT Search Report and Written Opinion, Aug. 24, 2005, 9 pages.
Kovacs, I.Z., Investigations of Outdoor-to-Indoor Mobile-to-Mobile Radio Communication Channels, IEEE, vol. 1, 2002, pp. 430-434.

(Continued)

*Primary Examiner*—Kambiz Zand
*Assistant Examiner*—William S Powers
(74) *Attorney, Agent, or Firm*—Barbara R. Doutre; Anthony P. Curtis

(57) ABSTRACT

A decryption apparatus (109) comprises a key stream generator (111) generating a local decryption key stream. It furthermore comprises a synchronization value receiver (201) receiving key stream synchronization values. A synchronization processor (203) implements a state machine which may operate in a synchronized state (303) wherein the communication is decrypted using the local key stream, a non-synchronized state (301) wherein the local key stream is not synchronized, or in an uncertain synchronization state (305) wherein the communication is decrypted using the local key stream and wherein the local key stream is synchronized to each new received synchronization value. The synchronization processor (203) furthermore comprises a transition controller (213) operable to transition from the synchronized state to the non-synchronized state in response to a first criterion and to the uncertain synchronization state in response to a second criterion.

9 Claims, 1 Drawing Sheet

OTHER PUBLICATIONS

Samarakoon, M.I., Encrypted Video Over Tetra, IEE Seminar on Tetra Market and Technology Developments, Feb. 2000, 6 pages.

PCT/US2005/013208, PCT Preliminary Report on Patentability, mailed Nov. 23, 2006, 7 pages.

Australian Patent Office, Australian Application No. 2005246691, Office Action, Examiner's First Report, Objections, Oct. 16, 2007, 2 pages.

Korean Patent Office, Korean Application No. 10-2006-7023612, Office Action, Notice of Preliminary Rejection [translated], Oct. 16, 2007, 4 pages.

Australian Patent Office, Australian Application No. 2005246691, Office Action, Examiner's Report #2, Jun. 12, 2008, 2 pages.

Mexican Patent Office, Mexican Application No. PA/a/2006/013096, Official Action [translated], translation dated Apr. 27, 2009, 2 pages.

Chinese Patent Office, Chinese Application No. 200580015321.8, Office Action [translated], Nov. 6, 2009, 6 pages.

European Patent Office, EPC Application No. 05737545.3, EPC Supplementary Search Report, Jan. 29, 2010, 4 pages.

ETSI EN 302 109, Terrestrial Trunked Radio (TETRA); Security; Synchronization Mechanism for End-to-end encryption, ETSI Standards, LIS, Sophia Antipolis, Cedex, France, vol. TETRA-6, No. V1.1.1, Oct. 1, 2003, 17 pages.

\* cited by examiner ized for specific purposes. For example, 
METHOD AND APPARATUS FOR DECRYPTING A COMMUNICATION

CROSS REFERENCE TO RELATED APPLICATIONS

This application claims the benefit of prior filed Great Britain Application No. 0410374.3, filed May 11, 2004 and International Application No. PCT/US2005/013208, filed Apr. 19, 2005, published by the International Bureau on Dec. 1, 2005 under WO 2005/114884 A1, and assigned to Motorola, Inc.

FIELD OF THE INVENTION

The invention relates to a method and apparatus for decrypting a communication and in particular, but not exclusively, to decrypting a call in a TETRA (TErrestrial Trunked RAdio) cellular communication system.

BACKGROUND OF THE INVENTION

In a cellular communication system, a geographical region is divided into a number of cells each of which is served by base station. The base stations are interconnected by a fixed network which can communicate data between the base stations. A remote unit is served via a radio communication link by the base station of the cell within which the remote unit is situated.

As a remote unit moves, it may move from the coverage of one base station to the coverage of another, i.e. from one cell to another. As the remote unit moves towards a new base station, it enters a region of overlapping coverage of two base stations and within this overlap region it changes to be supported by the new base station. As the remote unit moves further into the new cell, it continues to be supported by the new base station. This is known as cell reselection or handover.

Communication from a remote unit to a base station is known as uplink, and communication from a base station to a remote unit is known as downlink.

The fixed network interconnecting the base stations is operable to route data between any two base stations, thereby enabling a remote unit in a cell to communicate with a mobile station in any other cell. In addition, the fixed network may comprise gateway functions for interconnecting to external networks such as the Public Switched Telephone Network (PSTN), thereby allowing remote units to communicate with landline telephones and other communication terminals connected by a landline. Furthermore, the fixed network comprises much of the functionality required for managing a conventional cellular communication network including functionality for routing data, admission control, resource allocation, subscriber billing, mobile station authentication etc.

Examples of cellular communication systems include both public cellular communication system such as the Global System for Mobile communication (GSM) and Professional Radio (PMR) systems such as TETRA (TErrestrial Trunked RAdio).

Specifically, although TETRA may be used as a public cellular communication system, it is designed to provide a number of features and services which are particularly suitable for private organisations or groups such as the emergency services.

For example, TETRA provides a number of features and services for managing and controlling group calls as well as for managing the membership of these groups. Other features and services provided by TETRA include, push-to-talk channel allocation, broadcast calls etc. Also, in addition to trunked mode operation wherein remote units communicate via a base station, TETRA provides for the possibility of communication which is communicated directly between remote units. This is known as Direct Mode Operation (DMO) and allows remote units to set up and maintain direct communication between these.

TETRA is a Time Division Multiple Access (TDMA) system wherein 25 kHz wide channels are further divided into four time slots which may be individually assignable. Each time slot has a duration of 14.167 msecs and four timeslots are combined into a time frame having a duration of 56.67 msecs. Each of the four time slots in a time frame may be individually allocated to the same or different remote units. Furthermore, the time frames are combined into multiframes comprising 18 time frames. Frame number 18 is reserved as a control frame wherein control information may be communicated during an active call.

TETRA furthermore provides for a high level of security which may be optimised for specific purposes. For example, calls in TETRA may be end-to-end encrypted in order to prevent eavesdropping or interception of the messages. Such encryption is invaluable for many public services including for example law enforcement organisations.

End-to-end encryption mechanisms for TETRA are described in ETSI (European Telecommunication Standards Institute) specification EN 302 109. ETSI EN 302 109 specifies a voice encryption and decryption mechanism wherein an encryption function of a transmitting unit generates encrypted data that is communicated to a receiving unit where the inverse operation is performed to regenerate the original data. The encryption and decryption functions are based on key streams generated by a key stream generator at the transmitting unit and receiving unit respectively. In order to have successful decoding, it is essential that the key stream of the receiving unit is synchronised with the key stream of the transmitting unit. For this purpose, ETSI EN 302 109 specifies the communication of Synchronisation Values (SVs) from the transmitter to the receiver.

Specifically, a number of SVs are transmitted at the beginning of a call or following cell reselection thereby synchronising the key stream generators. In addition, SVs are sent during the ongoing call in order to allow receiving units missing the initial transmissions of SVs to enter the call later. This is known as late entry. In addition, the transmission of SVs during the call allows a receiving unit that looses synchronisation to re-acquire this during the call.

In accordance with ETSI EN 302 109, SVs are transmitted by half slot stealing wherein a time slot otherwise used for speech or data communication is used for transmission of the SVs. The stealing of half slots is dependent on a priority of the half slot. ETSI EN 302 109 does not prescribe when SVs should be transmitted during a call but suggests that an SV is sent after 0.25 seconds if the half slot is of low or no importance, after 0.5 seconds if the half slot has medium importance and after one second if the half slot has high importance. The interval between SVs thus typically varies between 0.25 and 1 second.

A problem associated with encryption of calls in communication systems such as TETRA is that when a mobile station moves between cells, the encryption synchronisation between the transmitting end and the receiving end may be lost. Typically, this occurs due to changes in the communication delay between the transmitting end and the receiving end, for example due to a changed propagation delay between the moving mobile station and the new base station, modified timing between the involved base stations in the infrastructure and/or allocation of a different time-slot on the new cell.

When the encryption synchronisation is lost, the call cannot be decrypted by the receiving end and the application of the non-synchronised key stream results in the generation of random data. The mobile station which has performed the cell reselection is aware that encryption synchronisation may have been lost and may accordingly proceed to mute the call to avoid that noise is output to the user. However, the mobile station(s) which have not performed the cell reselection has no information that this has occurred. Accordingly, it will proceed to decrypt the call using the non-synchronised key stream until the loss of synchronisation is detected. For a voice call this will result in a noise output rather than the desired speech.

A mechanism that may be used in Tetra is to compare the local key stream with the received SV. If the received SV matches the local stream, this is an indication that the end to end encryption is still synchronised. However, if the SV does not match the local key stream, this may be an indication that the encryption is no longer synchronised. A problem that arises in connection with this approach (also known as flywheeling) is that it is based on the assumption that the received SV is wrong due to an error introduced in the transmission e.g. in the RF channel and thus using the received SV the received would become out of sync with the transmitter. Therefore, the received SV is discarded as long as the encryption is considered to be synchronised, which is typically considered until a plurality of non-synchronised SVs have been received. However, in Tetra the end points may loose synchronisation in case of e.g. cell reselection as described earlier. In this case the received SV will not match the locally generated SV but contrary to the case when an error is introduced in the transmission, it is now the received SV that it is desirable to use. Therefore, the process of discarding the received SV leads to suboptimal performance.

Specifically, ETSI EN 302 109 prescribes that the encryption is to be considered in a synchronised state until a number, N, of consecutive SVs are incorrectly received. N is typically larger than 1 in order to ensure that an error in a single SV does not result in a synchronisation loss. However, for an increasing value of N the time before a synchronisation loss is detected increases. For example, for a typical value of N of 3, the synchronisation loss may not be detected for between 0.75 to 3 seconds in case the SV's are sent immediately after cell reselection is lost. This results in a significant and clearly perceptible noise output for a significant duration following a loss of synchronisation.

ETSI EN 302 109 furthermore prescribes that a decryption apparatus enters a non-synchronised state if loss of synchronisation is detected. When a new SV is received, this is used to synchronise the local key stream generator, after which the decryption apparatus enters the synchronised state and starts to decrypt the call. In the non-synchronised state, the local key stream is considered non-synchronised and accordingly the output is muted to prevent noise being output. This results in a break or gap in the speech which is perceptible to the user. Therefore, setting the value of N lower will result in a reduced risk or duration of noise intervals but increases the risk and frequency of gaps in the output caused e.g. by transmission errors in received SVs.

Hence, an improved system for decryption of calls would be advantageous and in particular a system providing an improved decryption resynchronisation performance, allowing increased flexibility, improved user data quality (e.g. improved audio quality) and/or reduced disruptions to an output signal would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention, there is provided an apparatus for decrypting a communication in a cellular communication system; the apparatus comprising: a key stream generator for generating a local key stream for decryption of the communication; means for receiving synchronisation values for synchronising the local key stream to a key stream of the communication; operating means for operating: in a synchronised state wherein the communication is decrypted using the local key stream, in a non-synchronised state wherein the local key stream is not synchronised, or in an uncertain synchronisation state wherein the communication is decrypted using the local key stream and the local key stream is synchronised to each new received synchronisation value; wherein the operating means is operable to transition from the synchronised state to the non-synchronised state in response to a first criterion and from the synchronised state to the uncertain synchronisation state in response to a second criterion.

The inventors of the current invention have realised that an improved performance may be achieved by having a more advanced loss of synchronisation processing.

In particular, the uncertain synchronisation state may combine advantageous features of the synchronised state and the non-synchronised state in situations where it is uncertain if synchronisation has been lost or not. For example, the first criterion may indicate with a high probability that synchronisation has been lost whereas the second criterion may indicate with a lower probability that synchronisation has been lost.

The uncertain synchronisation state may allow fast resynchronisation performance, which for example may be equivalent to the resynchronisation performance of the non-synchronised state. In addition, the uncertain synchronisation state may allow continued decryption using the local key stream. Hence, the additional state may allow fast resynchronisation without causing breaks in the decryption if a false loss of synchronisation is detected. The invention may thus provide a more flexible trade off between resynchronisation performance and the risk and duration of disruptions to the decryption.

The first and second criteria may be individually optimised to suit the characteristics of the uncertain synchronisation state and the non-synchronised state respectively thereby providing increased control of the desired encryption performance. Preferably, the criterions for transitioning between the states are thus different and optimised for the specific characteristics associated with each state.

The invention may allow a more gradual and flexible encryption resynchronisation operation. The invention may in particular provide improved quality of the decrypted signal, fewer decryption interruptions and improved resynchronisation speed.

According to a preferred feature of the invention, the first criterion comprises an evaluation of receive errors of synchronisation values. This may be a particular suitable criterion for detecting a loss of synchronisation and may in particular detect and indicate a synchronisation loss with a high probability. In particular, the non-synchronised state may be entered if more than a predetermined number of synchronisation values are received in error. The receive errors may be determined by a comparison of a received synchronisation value to the local key stream. In particular, a receive error may be determined to occur if the received synchronisation value is not synchronised with the local key stream.

According to a preferred feature of the invention, the second criterion comprises an evaluation of at least one non-encryption related characteristic. In particular, the second criterion may consist in an evaluation of one or more characteristics of the communication which are not directly associated with the encryption or decryption process such as parameters, variables and/or measurements which are not evaluated or used by the encryption and decryption algorithms. This allows for a possible encryption synchronisation loss to be detected based on non-encryption characteristics. This may allow for a faster and/or more reliable and/or more flexible detection of a possible synchronisation loss.

According to a preferred feature of the invention, the second criterion comprises an evaluation of a type of messages received by the apparatus. Preferably, the operating means is operable to enter the uncertain synchronisation state if a number of messages indicative of a communication error is received.

This may provide an efficient detection of a possible synchronisation loss and may in particular be advantageous in systems where a type of message being transmitted to the apparatus may be related to a synchronisation status of the communication. For example, in some communication systems, a loss of synchronisation will directly or indirectly result in a different type of messages being transmitted than if synchronisation was maintained. The apparatus may advantageously detect a high concentration of these messages and accordingly enter the uncertain synchronisation state. For example, in a TETRA system during cell reselection, the SwMI may not receive any uplink data from the mobile station for a short period of time and during this time, the SwMI will transmit a number of control plane messages by half slot stealing on the downlink path. Hence, an increased number of control messages being received may be an indication that synchronisation has been lost and accordingly the apparatus may enter the uncertain synchronisation state.

According to a preferred feature of the invention, the second criterion comprises an evaluation of receive errors of non-synchronisation value transmissions. This may allow a faster and/or more reliable and/or more flexile detection of a possible synchronisation loss. Synchronisation value transmissions are relatively infrequent but may result in a highly accurate synchronisation loss indication and may therefore be suitable for the first criterion. Using a criterion based on different transmissions allows a complementary detection of a possible synchronisation loss that is independent of the first criterion thereby providing increased synchronisation loss performance. In particular, it may allow a more frequent synchronisation status evaluation than the frequency of the transmission of synchronisation values.

According to a preferred feature of the invention, the non-synchronisation value transmissions are user data transmissions. The user data transmissions may for example be audio data transmissions, such as audio frames, for a voice communication. This allows for a possible synchronisation loss to be detected in response to more frequent transmissions that may provide a good indication of synchronisation status. Hence, an improved and faster detection of a possible synchronisation loss may be achieved.

According to a preferred feature of the invention, the second criterion comprises an evaluation of an error rate of the non-synchronisation value transmissions. This provides a good indication of a possible synchronisation process and is suitable for easy implementation. In particular, the error rate may be a suitable bit error rate (e.g. of the user data or of the channel data) or may be a frame erasure rate (e.g. of audio frames or data packets).

According to a preferred feature of the invention, the first criterion comprises an evaluation of only receive errors of synchronisation values and the second criterion comprises an evaluation of only receive errors of non-synchronisation value data. This may provide an efficient resynchronisation performance wherein different characteristics are used for entering the non-synchronised state and the uncertain synchronisation state.

According to a preferred feature of the invention, the operating means is operable to transition from the uncertain synchronisation state to the synchronous state if more than a predetermined number of synchronisation values synchronised with the local key stream have been received.

The predetermined number may be one or higher. Hence, the apparatus may remain in the uncertain synchronisation state until a number of synchronisation values have been received which are synchronised to the local key stream. This ensures the apparatus does not enter the synchronised state until there is a sufficiently high probability that the local key stream is synchronised and in particular ensures that an error in a single synchronisation value does not result in the apparatus entering the synchronised state with a non-synchronised local key stream.

According to a preferred feature of the invention, the operating means is operable to transition from the uncertain synchronisation state to the synchronous state when a synchronisation value is received. This may allow fast resynchronisation and a quick return to the synchronised state. The feature is particularly advantageous in applications wherein the probability of errors in the received synchronisation values is sufficiently low.

According to a preferred feature of the invention, the operating means does not comprise means for suppressing the decrypted user data when in the uncertain synchronisation state. This may allow a synchronisation operation of the uncertain synchronisation state wherein fast resynchronisation is achieved if synchronisation has been lost but without causing a break in the data if synchronisation has not been lost.

Preferably, the cellular communication system is a TETRA communication system and the communication is a voice call. In particular, the apparatus is preferably operable to implement encryption in accordance with ETSI standard EN 302 109.

According to a preferred feature of the invention, the operating means is operable to enter the uncertain synchronisation state if more than a predetermined number of TMD-Unitdata indications are received with Half Slot Stolen indication (HSS) different than Not Stolen. This may provide a particularly advantageous detection of a possible synchronisation loss in a TETRA communication system and is based on parameters readily available in a TETRA communication unit.

According to a preferred feature of the invention, the operating means is operable to enter the uncertain synchronisation state if more than a predetermined number of TMD-Unitdata indications are received with Half Slot Condition indication (HSC) different than "GOOD". This may provide a particularly advantageous detection of a possible synchronisation loss in a TETRA communication system and is based on parameters readily available in a TETRA communication unit.

According to a second aspect of the invention, there is provided a method of operation for an apparatus for decrypting a communication in a cellular communication system; the method comprising the steps of: generating a local key stream for decryption of the communication; receiving synchronisation values for synchronising the local key stream to a key stream of the communication; operating in a synchronised state wherein the communication is decrypted using the local key stream, operating in a non-synchronised state wherein the local key stream is not synchronised, and operating in an uncertain synchronisation state wherein the communication is decrypted using the local key stream and the local key stream is synchronised to each new received synchronisation value; and transitioning from the synchronised state to the non-synchronised state in response to a first criterion and from the synchronised state to the uncertain synchronisation state in response to a second criterion.

These and other aspects, features and advantages of the invention will be apparent from and elucidated with reference to the embodiment(s) described hereinafter.

BRIEF DESCRIPTION OF THE DRAWINGS

An embodiment of the invention will be described, by way of example only, with reference to the drawings, in which.

DETAILED DESCRIPTION OF A PREFERRED EMBODIMENT OF THE INVENTION

The following description focuses on an embodiment of the invention applicable to a TETRA cellular communication system. However, it will be appreciated that the invention is not limited to this application but may be applied to many other communication systems.

An embodiment of the invention will be described wherein an encrypted call is performed between a transmitter and a receiver both being compliant with the ETSI specification EN 302 109 v1.1.1. For brevity and clarity, the embodiment is described with reference to a voice call but in other embodiments other communication types may be supported such as for example a data call. The transmitter may specifically be part of a first subscriber terminal (such as a mobile station) and the receiver may specifically be part of a second subscriber terminal.

Figure 1:
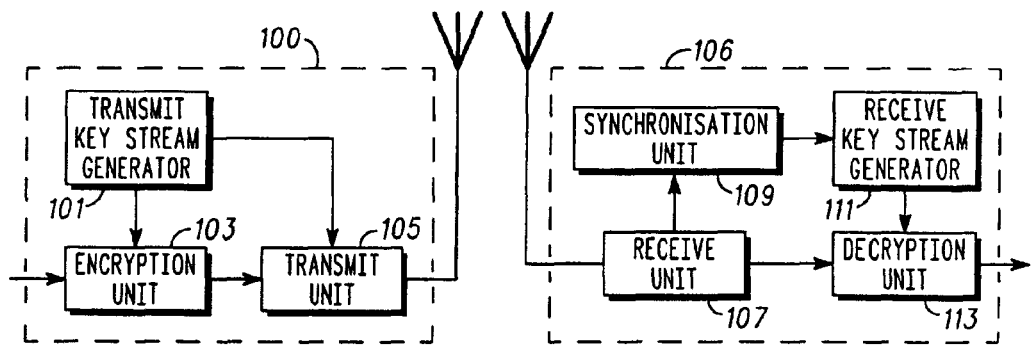
FIG. 1 illustrates a system for communicating an encrypted call in accordance with an embodiment of the invention.

FIG. 1 illustrates a system for communicating an encrypted call in accordance with an embodiment of the invention.

A transmitter 100 comprises a transmit key stream generator 101 which generates a key stream used for encrypting a message. The transmit key stream generator 101 is initialised with an initialisation value that is time varying and not known externally to the transmitter. The transmit key stream generator 101 is coupled to an encryption unit 103 which receives voice data to be transmitted and encrypts this in accordance with a suitable encryption function. In particular, the encryption function combines the voice data with the key stream to generate encrypted audio data.

The transmitter further comprises a transmit unit 105 coupled to the transmit key stream generator 101 and the encryption unit 103. The transmit unit 105 receives the encrypted data from the encryption unit 103 and transmits this over the air interface.

In addition, the transmit unit 105 receives encryption synchronisation values from the transmit key stream generator 101 and includes these in the transmitted bit stream. The synchronisation values allow the receiver to synchronise the decryption to the received data stream.

The synchronisation values are transmitted as encryption synchronisation messages by half-slot stealing wherein a user data transmission is partly or fully replaced by the encryption synchronisation message. In TETRA, the encryption synchronisation message is transmitted by replacing audio data in a full or a half time slot. Thus the transmit unit 105 is operable to replace the encrypted user data by synchronisation value data from the transmit key stream generator 101.

A receiver 106 comprises a receive unit 107 which receives the data stream transmitted by the transmit unit. The transmitter 100 and receiver 106 further comprise the functionality required or desired for communicating over the TETRA air interface including modulators, amplifiers, control circuitry etc as is well known to the person skilled in the art.

The receive unit is coupled to a synchronisation unit 109 and is operable to extract the synchronisation values and to feed these to the synchronisation unit 109. In response, the synchronisation unit 109 generates initialisation values for a receive key stream generator 111. Based on the initialisation values, the receive key stream generator 111 generates a key stream which is synchronised with the key stream of the transmitter. The receive key stream generator 111 is coupled to a decryption unit 113 which is further coupled to the receiving unit 107. The decryption unit 113 receives the encrypted audio and the key stream which is synchronised with the encrypted audio. Accordingly, it performs the inverse function of the function of the encryption unit 103 thereby generating a decrypted audio stream.

In order to provide initial synchronisation of the receive key stream generator 111, the transmitter transmits synchronisation values in connection with setting up of an encrypted call.

In addition, synchronisation values are transmitted at intervals throughout the call. This ensures that a receiver that looses synchronisation may re-establish this thereby enabling it to continue the call. Furthermore, the continued transmission of synchronisation values allows a receiver to join the call after this has been setup. This is known as late entry.

As an example of synchronisation loss is when a mobile station performs a reselection. For example, in a mobile to mobile voice call, one of the mobile stations may perform a reselection. This will typically result in a changed delay due to for example a new air interface propagation delay and different timing in the network. This may cause the locally generated key streams to loose synchronisation with the received signal. Although additional synchronisation values may be transmitted in this case, these may be missed by the receiver 106 due to for example a temporary propagation fading.

The TETRA specifications describe that synchronisation may be considered lost if more than a predetermined number of synchronisation values are received in error. However, before this is detected, the decryption will result in random data that results in a noise signal rather than the desired voice signal being output. Furthermore, the detection of the loss of synchronisation may take some time thereby resulting in a significant disruption in the output signal.

The mobile station performing the cell reselection is aware that synchronisation may have been lost and may therefore suppress the received user data until resynchronisation occurs and may in particular mute the output audio signal. However, the mobile station not performing the cell reselection has no information that the timing of the communication link may have changed and therefore relies on a detection of a loss of synchronisation.

Furthermore, in order to ensure that a false loss of synchronisation does not result in disruptions to the communication, it is important to reduce the number of false synchronisation loss detections. For example, signal conditions may result in one or more synchronisation values being received with errors and this may be detected as a synchronisation loss resulting in a disruption of the decryption. Hence, the trade off between the speed of detecting a synchronisation loss and the probability of a false synchronisation loss is critical for the perceived speech quality. The optimal decision criteria will typically be dependent on the specific conditions of the communication system. In many cases this trade off does not permit a satisfactory performance.

Figure 2:
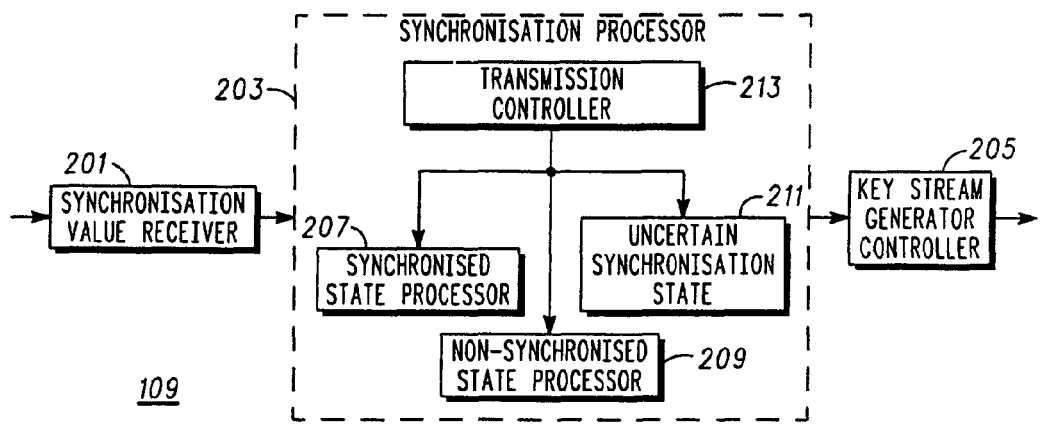
FIG. 2 illustrates an encryption synchronisation unit in accordance with an embodiment of the invention.

FIG. 2 illustrates an encryption synchronisation unit in accordance with an embodiment of the invention. In particular, FIG. 2 may illustrate the synchronisation unit 109 of FIG. 1 and will be described with reference to this.

The synchronisation unit 109 comprises a synchronisation value receiver 201 which receives synchronisation values. The synchronisation values are received from the receive unit 107. Thus, whenever the receive unit detects that a message comprises a synchronisation value this is fed to the synchronisation value receiver 201.

The synchronisation value receiver 201 is coupled to a synchronisation processor 203 which manages the synchronisation operation of the receiver 106. The synchronisation processor 203 is coupled to a key stream generator controller 205 which controls the receive key stream generator 111. In particular the key stream generator controller 205 is under the control of the synchronisation processor 203 operable to control the synchronisation of the receive key stream generator 111, and specifically may load a suitable synchronisation value in the receive key stream generator 111 thereby synchronising the receive key stream generator 111 to the key stream of the received signal.

Figure 3:
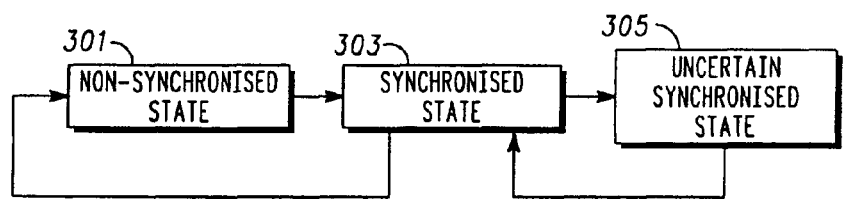
FIG. 3 is an illustration of synchronisation state machine in accordance with an embodiment of the invention.

The synchronisation processor 203 implements a synchronisation state machine which comprises three different synchronisation states. FIG. 3 is an illustration of synchronisation state machine of the synchronisation processor 203. In particular, the synchronisation processor 203 comprises a synchronised state processor 207 implementing a synchronised state 303 wherein the communication is decrypted using the local key stream, a non-synchronised state processor 209 implementing a non-synchronised state 301 wherein the local key stream is not synchronised and an uncertain synchronisation state 305 processor 211 implementing an uncertain synchronisation state 305 wherein the communication is decrypted using the local key stream and wherein the local key stream is synchronised to each new received synchronisation value.

Thus, the synchronisation processor 203 may operate in three different synchronisation states depending on the assumed synchronisation state. In the non-synchronised state, the local key stream is not synchronised with the key stream of the received signal and accordingly the signal cannot be decrypted. Therefore, the non-synchronised state processor 209 is operable to control the receiver 106 to mute the received signal to prevent a noise output signal. Furthermore, in this situation the synchronisation processor 203 will attempt resynchronisation and will specifically load the next received synchronisation value into the local key stream generator 111. The synchronisation processor 203 may then enter the synchronised state.

When the synchronisation processor 203 is in the synchronised state, the local key stream is synchronised with the key stream used to encrypt the received signal, and therefore the signal can be decrypted and a voice output presented to the user.

In contrast to the conventional TETRA synchronisation operation, the synchronisation processor 203 may also operate in an uncertain synchronisation state. This state is preferably entered when there is an uncertain indication that synchronisation may have been lost. In the uncertain synchronisation state, the synchronisation processor 203 combines features of the non-synchronised state and the synchronised state. Specifically, the receiver 106 proceeds to decrypt the received signal to generate an output signal using the current local key stream. At the same time, if a synchronisation value is received, this is used to resynchronise the local key stream generator 111 irrespective of whether it matches the local key stream or not. Thus, in the uncertain synchronisation state fast resynchronisation is achieved without interrupting the decryption or muting the output signal.

Hence, if indeed synchronisation has been lost, resynchronisation occurs very fast and only a very short interval of noise output results. Furthermore, if a false indication has occurred and synchronisation has not been lost, no break in the output signal results as the decryption is continued using the valid local key stream. Thus, whereas the non-synchronised state provides the best performance when synchronisation has been lost and the synchronised state provides the best performance when synchronization has not been lost, the uncertain synchronisation state provides an improved trade off for conditions where it is uncertain if synchronisation has been lost or not.

The synchronisation processor 203 further comprises a transition controller 213 which controls the transitions between the different states. In particular, the transition controller 213 is arranged to transition the synchronisation processor 203 from the synchronised state to the non-synchronised state in response to a first criterion and to the uncertain synchronisation state in response to a second criterion. Hence, different criteria are used for entering the non-synchronised state and the uncertain synchronisation state, and specifically the first criterion corresponds to a high probability that synchronisation has been lost whereas the second criterion corresponds to a lower probability that synchronisation has been lost.

In the described embodiment, the transition controller 213 is furthermore operable to transition the synchronisation processor 203 from either the non-synchronised state or the uncertain synchronisation state to the synchronised state in accordance with a common third criterion namely that a synchronisation value has been received.

Thus, the embodiment allows for a more flexible resynchronisation performance which may be provide better performance and improved quality of the generated user service. Specifically, a more gradual synchronisation loss mechanism may be implemented wherein a faster resynchronisation process may be achieved in many cases without resulting in a high number of gaps or breaks in the communication caused by muting of the output signal due to a false loss of synchronisation detection.

It will be appreciated that any suitable first and second criterion may be used without detracting from the invention.

Specifically, the first criterion may comprise an evaluation of receive errors of synchronisation values. The transition controller 213 may simply count the number of synchronisation values that have been sequentially received in error and if this exceeds a predetermined number it may cause a transition from the synchronised state to the non-synchronised state.

Any suitable algorithm or criterion for determining receive errors may be used. For example, in TETRA, the synchronisation values are transmitted by halt slot stealing in messages comprising internal check sums. Hence, a receive error may be considered to have occurred if a check sum check results in an error indication. Alternatively or additionally, a received synchronisation value may be compared to the local key stream. If the local key stream is synchronised to the incoming signal, the synchronisation value will match the local key stream. Hence, if these do not match, a receive error of the synchronisation value may be deemed to have occurred.

As transmission errors frequently occur in cellular communication systems, and therefore often occur in received synchronisation values without synchronisation having been lost, the predetermined number is preferably higher than one and may typically be around five. This will prevent frequent breaks in the output signal caused by the receiver 106 falsely entering the non-synchronised state.

Preferably, the second criterion comprises an evaluation of at least one non-encryption parameter. In particular, the second criterion may be an evaluation of a characteristic or parameter which is not a part of the encryption or decryption process. This will allow an increased variation and diversity in the criteria used for detecting synchronisation losses thereby improving the probability of fast synchronisation loss detection and thus resynchronisation.

Specifically, the second criterion is preferably based on a characteristic which can be evaluated more frequently than the synchronisation values, which in TETRA may only be transmitted as little as once per second. In the described embodiment, the second criterion comprises an evaluation of receive errors of non-synchronisation value transmissions and in particular of receive errors of non-synchronisation value transmissions that occur more frequently than the synchronisation value transmissions.

In particular the second criterion preferably evaluates receive errors of user data transmissions, and in the specific example of a voice call receive errors of audio frames are evaluated. If a high concentration or number of audio frames are received in error, this may be an indication that synchronisation has been lost but may also occur in response to a temporary propagation fade. Therefore, entering the uncertain synchronisation state will allow both fast resynchronisation if synchronisation has been lost and continued audio output if a fade condition has occurred.

A suitable criterion may comprise an evaluation of an error rate of the audio data. For example, if too many audio frames are received in error, this high frame error rate may be an indication of a possible synchronisation loss.

As a specific example of second criterion suitable for TETRA, the transition controller 213 may receive information related to the reception of TMD-Unitdata messages. The second criterion may comprise or consist in determining if more than a predetermined number of TMD-Unitdata indications are received with Half Slot Condition indication (HSC) different than "GOOD". Hence, if a Half Slots are received having a HSC of e.g. "Bad" (indicating unsuccessful reception), this may indicate a possible synchronisation loss and accordingly the transition controller may enter the synchronisation processor 203 into the uncertain synchronisation state.

In some embodiments, it may be particularly suitable to evaluate the type of messages which are received and to enter the uncertain synchronisation state in response to this evaluation. For example, in some applications the type of messages being transmitted by a base station may be an indication of a communication error that may imply a loss of synchronisation.

Hence, as a specific example of second criterion suitable for TETRA, the transition controller 213 may receive information related to control plane stealing for TMD-Unitdata messages. The second criterion may comprise determining if more than a predetermined number of TMD-Unitdata indications are received with a Half Slot Stolen indication (HSS) different than Not Stolen i.e. if more than the predetermined number of stolen TMD-Unitdata messages are received e.g. within a given time interval or sequentially.

It will be appreciated that the second criterion does not necessarily comprise only a single condition or evaluation of a single parameter but that any suitable number and combinations of conditions may be used. For example, the specific examples provided for TETRA may be alternatives such that the uncertain synchronisation state is entered if any one of the conditions is met.

In the described embodiment, the transition from the uncertain synchronisation state to the synchronised state occurs whenever a synchronisation value is received. In particular, if a synchronisation value is received with a correct check sum, this value may be loaded into the receive key stream generator 111 and the synchronisation processor 203 enters the synchronised state without further validation.

In other embodiments, other criteria for exiting the uncertain synchronisation state may be used. For example, the synchronisation processor 203 may transition from the uncertain synchronisation state to the synchronised state if more than a predetermined number of synchronisation values are received which are synchronised with the local key stream.

In particular, in the uncertain synchronisation state, received synchronisation values are used to synchronise the local key stream but are also compared to the existing local key stream. If these match, this is an indication that the local key stream is synchronised and that the synchronised state should be entered. The higher the predetermined number, the lower the risk of entering the synchronised state based on a synchronisation value which has been received with errors. Hence, this approach may prevent that transmission errors affecting a synchronisation value result in the synchronised state being entered with a non-synchronised local key stream.

The invention can be implemented in any suitable form including hardware, software, firmware or any combination of these. However, preferably, the invention is implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with the preferred embodiment, it is not intended to be limited to the specific form set forth herein. Rather, the scope of the present invention is limited only by the accompanying claims. In the claims, the term comprising does not exclude the presence of other elements or steps. Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. In addition, singular references do not exclude a plurality. Thus references to "a", "an", "first", "second" etc do not preclude a plurality.

The invention claimed is:

1. An apparatus for decrypting a communication in a cellular communication system; the apparatus comprising:
   a key stream generator for generating a local key stream for decryption of the communication;
   means for receiving synchronisation values for synchronising the local key stream to a key stream of the communication;
   operating means for operating
      in a synchronised state wherein the communication is decrypted using the local key stream,
      in a non-synchronised state wherein the local key stream is not synchronised, or
      in an uncertain synchronisation state wherein the communication is decrypted using the local key stream and the local key stream is synchronised to each new received synchronisation value; and
   wherein the operating means is operable to transition from the synchronised state to the non-synchronised state in response to a first criterion and from the synchronised state to the uncertain synchronisation state in response to a second criterion based on a non-encryption related parameter.

2. An apparatus as claimed in claim 1 wherein the first criterion comprises an evaluation of receive errors of synchronisation values.

3. An apparatus as claimed in claim 1 wherein the second criterion based on the non-encryption related parameter further comprises an evaluation of at least one of a) the non-encryption related parameter, b) a type of messages received by the apparatus, c) receive errors of non-synchronisation value transmissions, d) an error rate of the non-synchronization value transmissions.

4. An apparatus as claimed in claim 3 wherein the operating means is operable to enter the uncertain synchronisation state in response to a number of messages indicative of a communication error being received.

5. An apparatus as claimed in claim 1 wherein the operating means is operable to transition from the uncertain synchronisation state to the synchronous state when at least one of a) more than a predetermined number of synchronisation values synchronised with the local key stream have been received and b) a synchronisation value is received.

6. An apparatus as claimed in claim 1 wherein the operating means does not comprise means for suppressing the decrypted user data when in the uncertain synchronisation state.

7. An apparatus as claimed in claim 1 wherein the operating means is operating within a Terrestrial Trunked Radio (TETRA) communication system.

8. An apparatus as claimed in claim 7 wherein the operating means is operable to enter the uncertain synchronisation state if more than a predetermined number of TMD-Unitdata indications are received with at least one of a) Half Slot Stolen indication (HSS) different than a first predetermined condition and b) Half Slot Condition indication (HSC) different than a second predetermined condition.

9. A method of operation for an apparatus for decrypting a communication in a cellular communication system; the method comprising the steps of:
   generating a local key stream for decryption of the communication;
   receiving synchronisation values for synchronising the local key stream to a key stream of the communication;
   operating in a synchronised state wherein the communication is decrypted using the local key stream,
   operating in a non-synchronised state wherein the local key stream is not synchronised, and
   operating in an uncertain synchronisation state wherein the communication is decrypted using the local key stream and the local key stream is synchronised to each new received synchronisation value; and
   transitioning from the synchronised state to the non-synchronised state in response to a first criterion and from the synchronised state to the uncertain synchronisation state in response to a second criterion based on a non-encryption related parameter.

* * * * *

UNITED STATES PATENT AND TRADEMARK OFFICE
CERTIFICATE OF CORRECTION

| | | |
|---|---|---|
| PATENT NO. | : 7,840,008 B2 | Page 1 of 1 |
| APPLICATION NO. | : 11/539213 | |
| DATED | : November 23, 2010 | |
| INVENTOR(S) | : Pedersen | |

It is certified that error appears in the above-identified patent and that said Letters Patent is hereby corrected as shown below:

ON THE TITLE PAGE

Item (56), under "OTHER PUBLICATIONS", in Column 2, Line 4, delete "Computers vol. 52" and insert -- Computers, vol. 52, --, therefor.

IN THE SPECIFICATION

In Column 3, Line 17, delete "Tetra" and insert -- TETRA --, therefor.

In Column 3, Line 31, delete "Tetra" and insert -- TETRA --, therefor.

In Column 6, Lines 19-28, delete "The predetermined....key stream." and insert the same at Line 18, after "received.", as a continuation of the paragraph.

In Column 7, Line 25, delete "which" and insert -- which: --, therefor.

In Column 7, Lines 33-34, delete "OF A PREFERRED EMBODIMENT" and insert -- OF THE PREFERRED EMBODIMENTS --, therefor.

Signed and Sealed this
Fifth Day of June, 2012

David J. Kappos
*Director of the United States Patent and Trademark Office*